United States Patent
Wang et al.

(10) Patent No.: US 6,471,417 B1
(45) Date of Patent: Oct. 29, 2002

(54) HIGH POWER OPTICAL ADAPTER

(75) Inventors: Hongchuan Wang, Fremont, CA (US); Mei Yan, Cupertino, CA (US)

(73) Assignee: Nexfon Corporation, Fremont, CA (US)

( * ) Notice: Subject to any disclaimer, the term of this patent is extended or adjusted under 35 U.S.C. 154(b) by 0 days.

(21) Appl. No.: 09/559,337

(22) Filed: Apr. 27, 2000

(51) Int. Cl.$^7$ ................................................. G02B 6/38
(52) U.S. Cl. ........................................................ 385/72
(58) Field of Search ............................. 385/72, 60, 73, 385/64, 78

(56) References Cited

U.S. PATENT DOCUMENTS

| | | | |
|---|---|---|---|
| 5,594,825 A | * | 1/1997 | Kawasaki et al. ............. 385/27 |
| 5,781,680 A | * | 7/1998 | Womack et al. ............... 385/53 |
| 5,993,071 A | * | 11/1999 | Hultermans ................... 385/53 |
| 6,095,695 A | * | 8/2000 | Ohtsuka et al. ............. 385/134 |

* cited by examiner

*Primary Examiner*—Tulsidas Patel
(74) *Attorney, Agent, or Firm*—Bo-In Lin

(57) ABSTRACT

The present invention discloses a low-cost high power optical adapter employed to reduce the effects of the contaminants in the high power fiber optical transmission systems. The high power optical adapter uses the exactly same housing of the standard plug style single mode optical attenuators. The attenuating fiber is replaced by a TEC fiber. The TEC fiber has an MFD of more than 25 um at one end and an MFD of about 10 um at the other end that is the same as a standard single mode fiber. In the high power optical adapter, the large MFD end of the TEC fiber is fixed at the male side of the ferrule and the small MFD end of the TEC fiber is fixed at the female side of the ferrule. When the high power optical adapter is employed, the original pair of the standard optical connectors are first disconnected from the standard mating sleeve. Then each of these connectors is mounted into the female sides of a pair of the high power optical adapters. Then the male sides of the pair of the high power optical adapters are connected together through the standard mating sleeve. During the system test, if the high power optical adapters are not needed, then the standard optical connectors can be just dismounted from the high power optical adapters and then reconnected together through the standard mating sleeve.

24 Claims, 6 Drawing Sheets

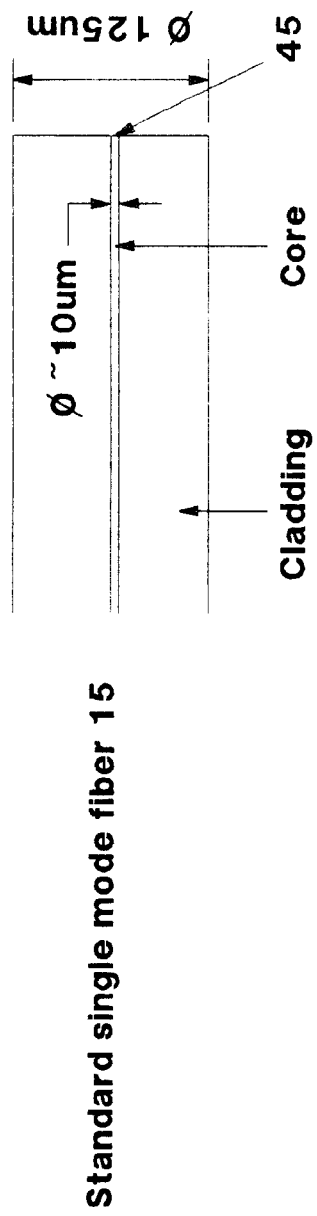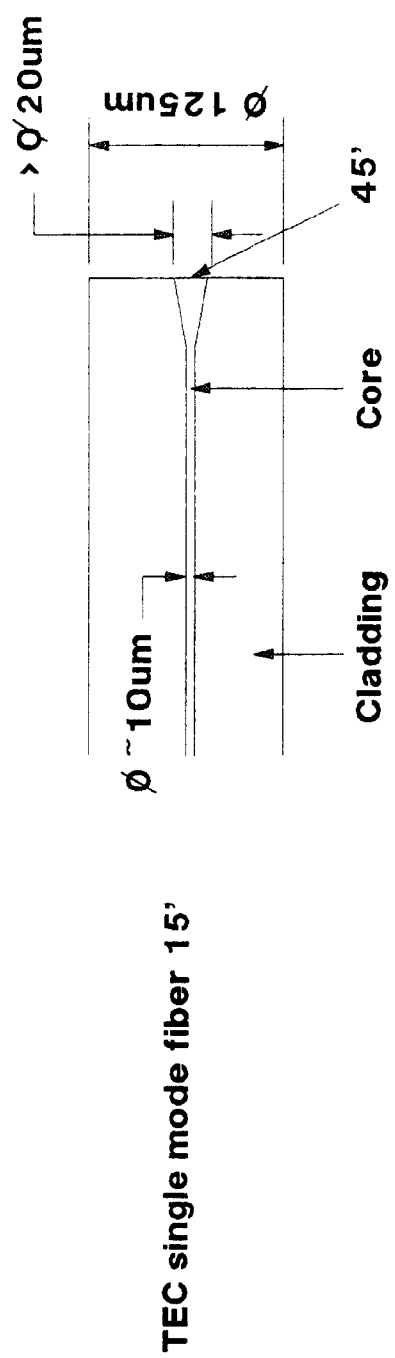

HIGH POWER OPTICAL ADAPTER

FIELD OF THE INVENTION

This invention relates generally to a method and system for use in optical fiber technology. More particularly, this invention relates to a method and system for providing a high power optical adapter.

BACKGROUND OF THE INVENTION

In fiber optical transmission systems, high power optical signals are being broadly employed to increase their transmission capacity over a greater distance. However, those of ordinary skill in the art now encounter technical problems and limitations as the optical signals are transmitted through the fiber optic system with higher power. FIGS. 1A and 1B illustrate a specific example of such technical problem in a fiber optical transmission system where optical connectors are commonly employed to provide low loss coupling of optical fibers. A standard single-mode optical fiber 15 is commonly connected to a standard optical connector 20. Each connector 20 has a ferrule 25 to surround and support the optical fiber 15 and to extend from the front end of the connector 20 to form a mating optical-fiber extension 30. A mating sleeve 40 has two mating inlet 35 to receive the optical-fiber extension 30 such that two segments of optical fiber can now closely engage to each other with accurately end-surface-to-end-surface alignment for optical signal transmission. Referring to FIG. 1B where two end surfaces 45 of two optical fibers 15 are mated with the mating sleeve 40 to engage to each other at an interface surface 50.

When the optical connectors are connected and disconnected in the process of carrying out the system tests, the end surfaces 45 of the fiber of the optical connectors are often contaminated from dirt, debris, grease and other contaminants. Damages often occur to the connectors 20 with the contaminants now deposited on the end-surfaces 45 of the optical connectors. Under the conditions of signal transmission of optical signals with higher power, the optically non-transmissive contaminants absorb the optical energy and become heated up by the optical signals. The heated contaminants continuously scorch, pit and finally damage the fiber end surfaces of the optical connectors. At the end, the optical connectors 20 lose the optical transmission function thus generates a problem for the entire optical signal transmission system. Due to the facts that the contaminants are very small particles and the end surfaces 45 of the connectors have very small surface areas, the problems caused by the contaminated end-surfaces in the connectors cannot be easily resolved by applying cleaning processes.

Specifically, the most popular optical connectors employed in fiber optical signal transmission systems are connectors for connecting standard single mode fibers having a mode filed diameter (MFD) of about 10 um at 1550 nm wavelength. Due to the small MFD, a very high power density is presented in transmitting the optical signals because the smaller the cross sectional area the higher the power density. Furthermore, due to the small MFD and high power density, the problems of heat generation as a result of contaminant deposit on the end surfaces 45 of the fiber connectors 20 are becoming more serious. With increased power of the signals transmitted in the optical fiber signal transmission system, the thermal damage problems becomes even more serious and an urgent demand now exists to resolve this difficulties as soon as possible.

Many efforts have been devoted to address this problem in attempt to reduce the damaging effects arising from deposit of the contaminants on the end surfaces. One approach is to reduce the power density of the optical signals at the end surfaces of the connector fiber. At these end surfaces, an operation is often carried out to connect or disconnect for system testing and other types of system reconfigurations. Most likely, the contaminants are deposited on the end surfaces. By increasing the surface area of the end surfaces will reduce the thermal damage problems as the power density is decreased with the increase of the surface area. Reduction in power density will also proportionally reduce the energy absorption and results in a lower level of heat generation. Hence, by enlarging the MFD of the optical fiber would therefore lead to a reduced power density and consequently lower level of heat generation due to optical energy absorption.

In the U.S. Pat. No. 5,594,825, special optical connectors are disclosed as that shown in FIGS. 2A and 2B. In the patented optical connectors, Kawasake et al. employ the thermal expand core (TEC) fibers which have special configuration near the end of the fiber where the surface areas are enlarged as that shown FIG. 3B. In order to reduce the unwanted effects of the connectors associated with high power density, the optical connector ferrule 25' is specially shaped to adopt the TEC fibers. By replacing the standard single mode fibers with the TEC fibers 15', the end surface areas 45' are significantly enlarged because the MFD of the TEC fibers 15' are typically 2–3 times larger than that of the standard single mode fibers, The area of the end surfaces 45' is enlarged four to nine times. The power density of the optical signals is proportionally reduced to a lower level at the end surfaces 45' of the TEC fibers 15' than that at the end surfaces 45 of the standard single mode fibers 15. The thermal problems caused by contaminant heating thus become less serious at the end surfaces 45' of the TEC fibers 15' than that at the end surfaces 45 of the standard single mode fibers 15. Thus, the risks of connector damage caused by overheating at the fiber end surfaces 45' of the optical connectors are substantially reduced.

Even though the special optical connectors 20' utilizing TEC fibers 15' can function properly and the damages caused by overheating in the connectors due to contaminant deposit are reduced, practical application of these types of connectors generates additional difficulties and inconveniences. For the purpose of employing the special TEC optical connectors 20' on the existing fiber optic signal transmission systems, the installed standard optical connectors 20 has to be cut off from the single mode fibers 15 of the fiber optical transmission systems. Then, the special optical connectors 20' must be spliced into the single mode fibers 15 of the fiber optical transmission systems. Due to the facts that the special optical connectors 20' are not compatible with the standard optical connectors 20, this kind of fiber cutting and splicing need to be repeated many times during the system test and thus is very time-consuming. These additional cutting and splicing processes may also lead to further reliability or signal transmission problems if these cutting and splicing processes are not performed according to certain system specification. Practical difficulties thus arise from significant increase in production cost by implementing TEC fiber connector 20' for providing a high-power fiber optical signal transmission systems.

Therefore, a need still exists in the art of design and manufacturing fiber-optic signal-transmission system to provide new configuration and method of manufacture the signal transmission system to overcome the difficulties discussed above. Specifically, high power optical adapters that are readily compatible with the existing fiber optical connector that can be provided at a relatively economical production cost at large quantity would be most desirable. It is also necessary to provide more flexibility and convenience of assembling and disassembling for system tests and reconfiguration such that these tasks can be more easily performed.

SUMMARY OF THE PRESENT INVENTION

It is therefore an object of the present invention to provide a new and low-cost configuration for interconnecting optical fibers suitable for high power transmission without the inconveniences of repetitive fiber cutting and splicing operations. By providing a low cost, readily available and flexible high power optical adapter, the aforementioned difficulties and limitations in the prior art can now be resolved.

Specifically, it is an object of the present invention to provide a new configuration of interconnecting optical fiber by employing a novel high power optical adapter. The high power optical adapter is purposefully arranged to be compatibly adaptable with standard connectors and mating sleeve commonly employed in the optical fiber industries such that no changes of design or reconfiguration of current optical components are required. Meanwhile, the new high power optical adapter implements the TEC fiber to reduce the power density to circumvent the overheating problems. Flexibility and convenience in operations for connection, disconnection or reconfiguration to carry out different kinds of tests and repairs can now be easily performed without cutting or splicing fibers. Time and cost savings are achieved and reliability and productivity are improved by implementing this novel high power optical adapter.

It is another object of this invention to teach a new configuration of interconnecting optical fiber by employing a novel high power optical adapter which can be conveniently manufactured by employing the housing of a commonly available attenuator. Compatibility of the high power fiber optical adapter is readily achieved at low cost without extra design and manufacture efforts. The high power optical adapter can be manufactured by simply replacing the attenuator core with a TEC fiber. Cost effective implementation of this flexible high power optical adapter can therefore be realized with minimum system and component changes.

Briefly, in a preferred embodiment, the present invention discloses a low-cost high power optical adapter employed to reduce the effects of the contaminants in the high power fiber optical transmission systems. The high power optical adapter uses the exactly same housing of the standard plug style single mode optical attenuators. The attenuating fiber is replaced by a TEC fiber. The TEC fiber has an MFD of more than 25 um at one end and an MFD of about 10 um at the other end that is the same as a standard single mode fiber. In the high power optical adapter, the large MFD end of the TEC fiber is fixed at the male side of the ferrule and the small MFD end of the TEC fiber is fixed at the female side of the ferrule. When the high power optical adapter is employed, the original pair of the standard optical connectors is first disconnected from the standard mating sleeve. Then each of these connectors is mounted into the female sides of a pair of the high power optical adapters. Then the male sides of the pair of the high power optical adapters are connected together through the standard mating sleeve. During the system test, if the high power optical adapters are not needed, then the standard optical connectors can be just dismounted from the high power optical adapters and then reconnected together through the standard mating sleeve.

These and other objects and advantages of the present invention will no doubt become obvious to those of ordinary skill in the art after having read the following detailed description of the preferred embodiment which is illustrated in the various drawing figures.

BRIEF DESCRIPTION OF THE DRAWINGS

FIGS. 3A and 3B are cross sectional views of a standard single mode fiber and a TEC single mode fiber;

DETAILED DESCRIPTION OF THE PREFERRED EMBODIMENT

Figure 4:
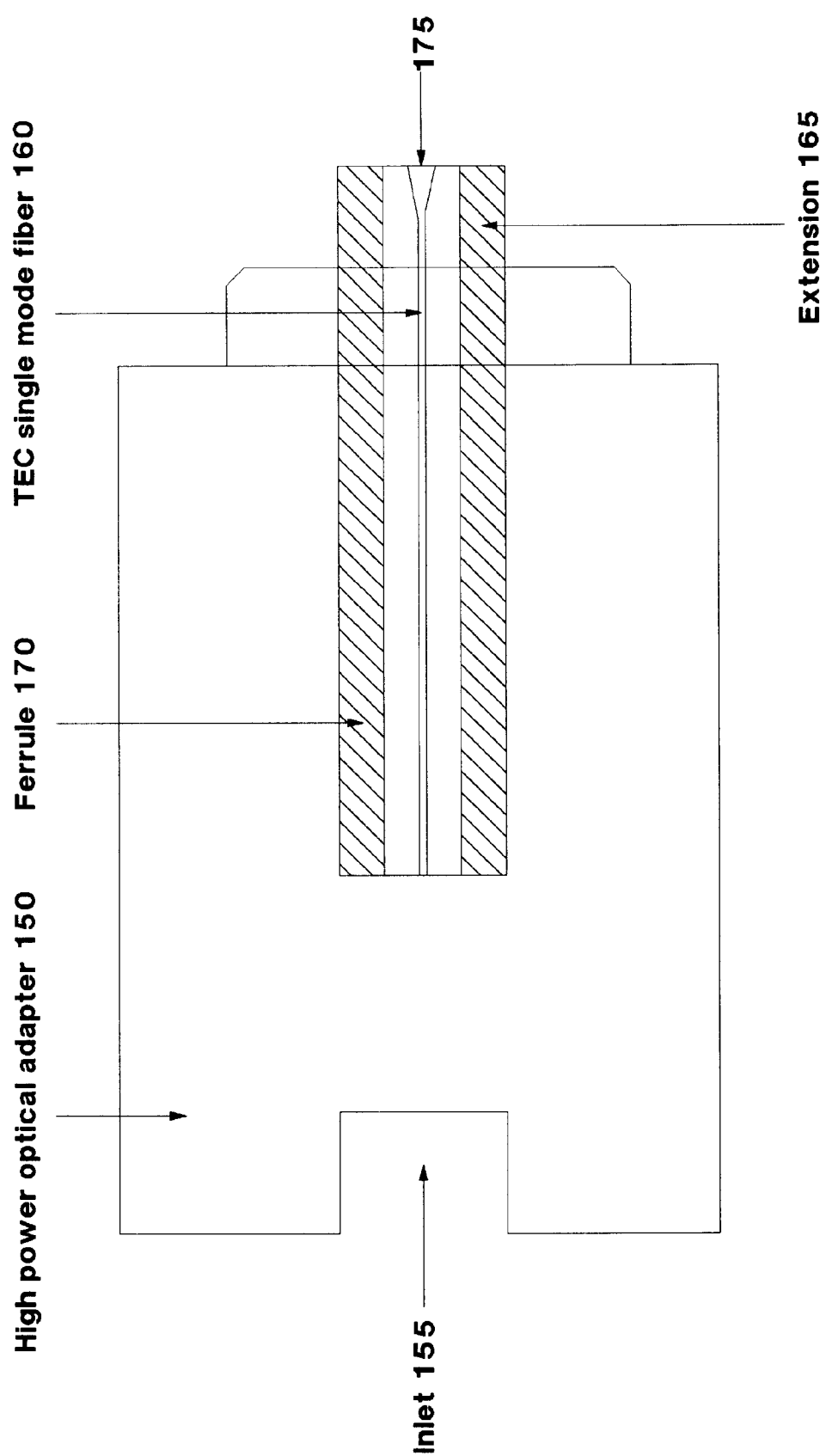
FIG. 4 is a cross sectional view of the high power optical adapter of the present invention.
Figure 5A:
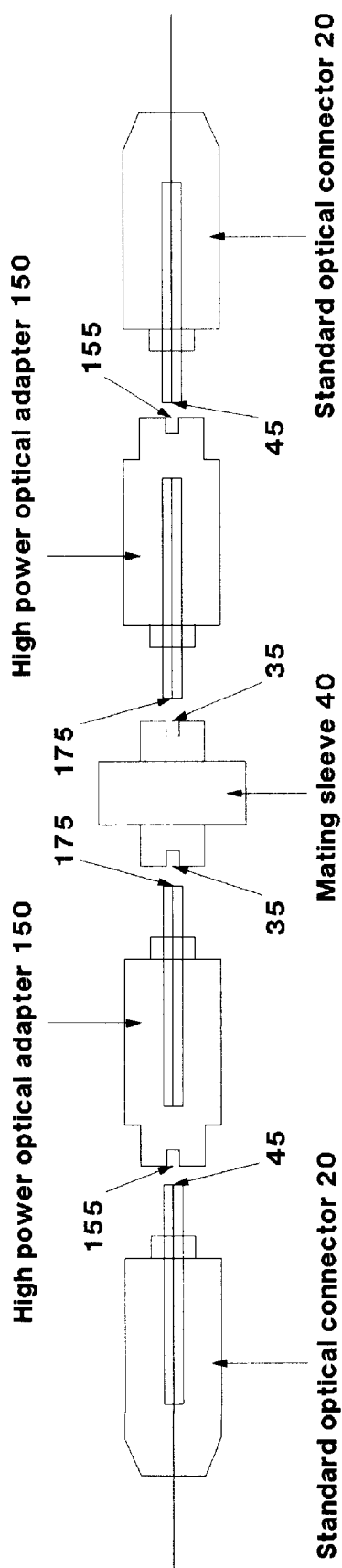
FIGS. 5A and 5B are cross sectional views of high power optical adapters employed for interconnecting two optical fiber segments, each has a terminal end connected with a standard optical connector.
Figure 5B:
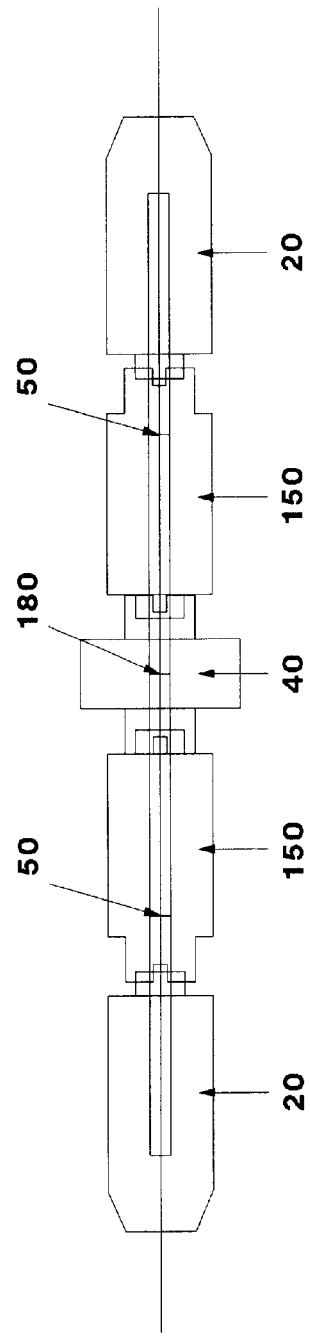

The present invention discloses a high power optical fiber adapter for providing a cost effective, flexible, convenient, and immediate solution to reduce the high power transmission damages occurred to the existing optical fiber connectors. Referring to FIG. 4 for a preferred embodiment of a high power optical adapter 150 of this invention. The high power optical adapter 150 has a standard-connector mating-inlet 155 to compatibly receive the standard optical-fiber mating-extension 30. Referring now to FIGS. 5A and 5B, the standard optical connector with a standard optical-fiber mating-extension 30 when mated with the high power optical adapter 150 is precisely aligned and immediately engaged to a TEC optical fiber 160 of the high power optical adapter 150. The TEC optical fiber 160 of the high power optical adapter 150 is surrounded and supported by a ferrule 170 that has a standard size and shape just like that of the ferrule 25 for the standard connector shown in FIGS. 1A and 1B. The ferrule 170 surrounds and supports the TEC optical fiber 160 extends from the body of the high power optical adapter 150 to form a TEC-fiber mating-extension 30' that has a standard size and shape just like a standard optical-fiber mating-extension 30 commonly formed on a standard optical connector 20. The TEC fiber 160 of the high power optical adapter has an end surface 175, just like end surface 45' shown in FIG. 3B, that is enlarged to approximately four to nine times the end surface area of a regular optical fiber. Referring to FIGS. 5A and 5B for a configuration to implement the high power optical adapters of this invention. Instead of mating the standard optical connectors 20 via a mating sleeve to each other as that shown in FIGS. 1A and 1B, the standard connectors 20 are first mated with the high power optical adapter 150. The optical-fiber mating extension 30 is received into the stand connector mating-inlet 155 of the high power optical adapter 150 for aligning with and engaging to the TEC fiber 160 of the high power optical adapter 150. Then the high power optical adapter 150, now mated with the standard connector 20, are then mated together by employing a standard mating sleeve 40 with the TEC-fiber mating-extension 30' received into the standard mating inlet 35. The TEC fiber 160 of the high power optical adapter 150 now aligned and engaged to each other at an interface surface 180 that has an enlarged end-surface area. Meanwhile, the standard fiber 15 is also aligned and engaged to the TEC-fiber of the high power optical adapter 150 at an interface area 50. However, for testing and reconfiguration operations, it is not necessary to remove the high power optical adapter 150 from the standard connector 15. The end surfaces 45 of the regular optical fiber 15 are prevented from being contaminated. During testing and reconfiguration operations, the high power optical adapter 150 are connected and disconnected from the mating sleeve 40 while the standard optical connectors 20 are connected to the high power optical adapters 150. Since the areas of the end surfaces 175 of the high power optical adapters 150 are enlarged four to nine times as compared to those of the standard optical connectors 20, the power density of the optical signals is proportionally reduced to a lower level at the end surfaces 175. The risks of connector damage caused by overheating at the fiber end surfaces 175 of the high power optical adapters 150 are substantially reduced. If the high power optical adapters 150 are not needed, the standard optical connectors 20 can be just dismounted from the high power optical adapters 150 and then reconnected together through the standard mating sleeve 40. Unlike the above-discussed special TEC optical connector 20' as that shown in FIGS. 2A and 2B, fiber cutting and splicing is no longer needed for the high power optical adapters 150. Therefore, the high power optical adapter 150 can be conveniently employed to reduce the effects of the contaminants in the high power fiber optical transmission systems.

For practical applications, the cost of the high power optical adapters 150 should be as low as possible. As an example to built the low-cost high power optical adapter 150 shown in FIG. 4, a standard housing with exactly same shape and size and standard plug style for single mode fiber application may be used. A commonly available device is a standard plug style single mode optical attenuator. The standard plug style single mode optical attenuators have been widely employed in fiber optical transmission systems and are currently manufactured by many companies worldwide, including AMP in Palo Alto, Calif., Senko Advanced Components in Southboro, Mass., Storm Products in Westmont, Il., and Alliance Fiber Optic Products in Sunnyvale, CA. The housing of the plug style single mode optical attenuators has been standardized and is commonly available at low cost. When the housing of the standard the plug style single mode optical attenuators is employed to build the lowcost high power optical adapters, the attenuating fibers are simply replaced with the TEC fibers. The TEC fibers 160 have MFDs of more than 25 um at one end and MFDs of about 10 um at the other end, which is the same as the standard single mode fibers. In the high power optical adapter 150, the large MFD end 175 of the TEC fiber 160 is fixed at the male side of the ferrule 170 and the small MFD end of the TEC fiber 160 will fixed at the female side of the ferrule 170.

According to FIGS. 4, 5A and 5B, a high power optical adapter is disclosed in this invention. The high power optical adapter 150 is compatibly connectable to standard fiber optical components. The high power optical adapter 150 includes a standard attenuator housing supporting a ferrule 170. The high power optical adapter 150 further includes a thermally expanded core (TEC) fiber 160 inserted in the ferrule 170 supported by the standard attenuator housing. In a preferred embodiment, the thermally expanded core (TEC) fiber 160 having a mode field diameter greater than 20 micrometers. In a preferred embodiment, the standard attenuator housing further comprising a standard female-type mating-inlet 155 for mating and connecting with a standard optical connector 20. In another preferred embodiment, the ferrule 170 inserted with the TEC fiber 160 further extends from the standard attenuator housing for providing a male-type mating-extension. In another preferred embodiment, the thermally expanded core (TEC) fiber inserted in the ferrule having an expanded end surface at the male-type mating-extension. In another preferred embodiment, the male-type mating-extension is compatibly adaptable into a standard mating sleeve for optically aligning with and physically engaging another optical component compatible with the standard mating sleeve.

Figure 6:
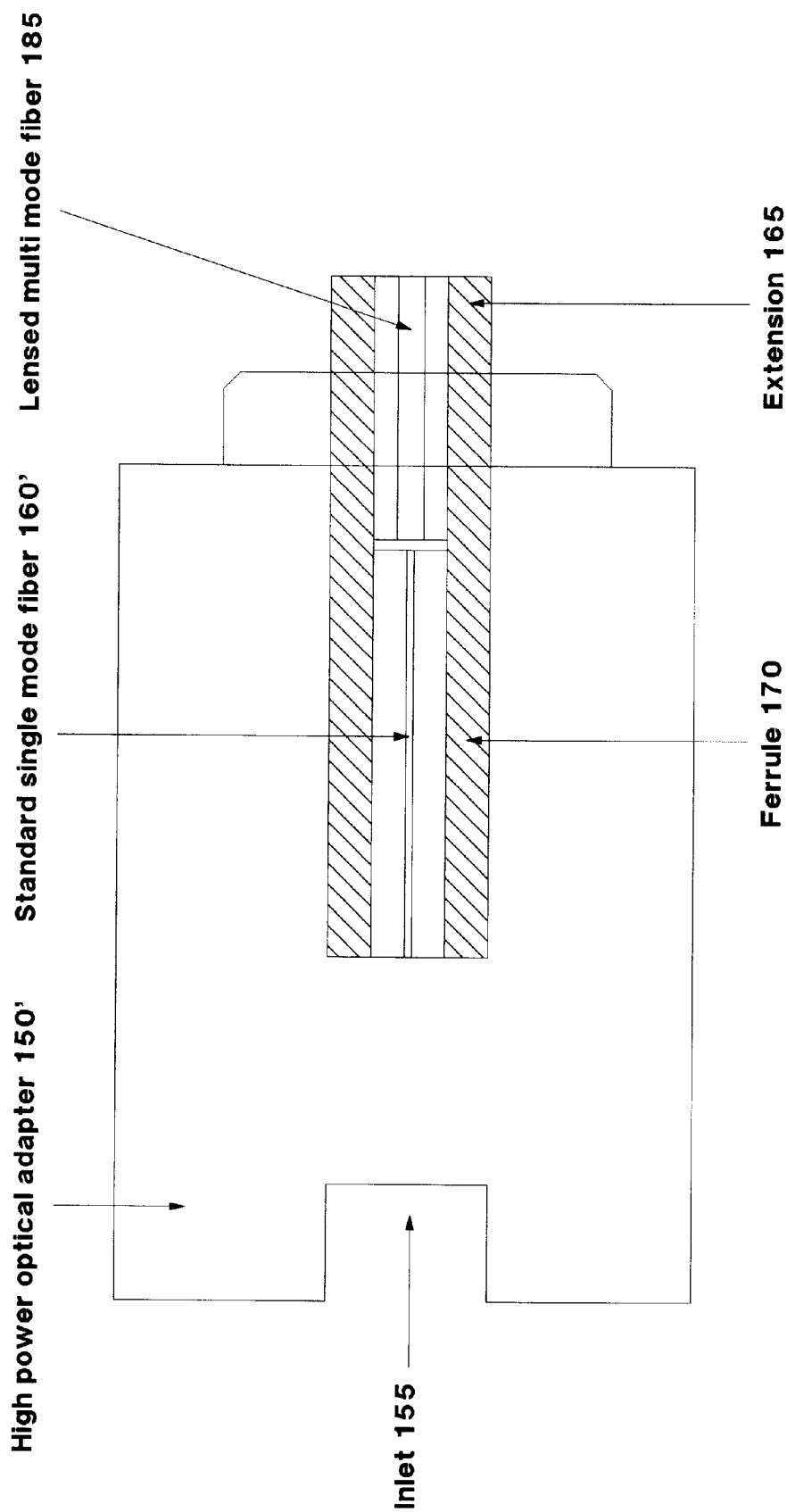
FIG. 6 is a cross sectional view of the high power optical adapter in another preferred embodiment according to the present invention.

FIG. 6 shows an alternate configuration of a high power adpater as another embodiment of this invention. In FIG. 6, instead of the TEC fiber, as that shown in FIG. 4, a standard single mode fiber 160' is fused to a graded index lens/multi-mode fiber 185. The graded index lens/multi-mode fiber 185 has the same diameter as that of a TEC fiber end-surface 175 (See FIG. 4) and a same reduction of power density at the end surface 175 is achieved.

This invention further discloses an optical signal transmission system that includes two optical fibers 15, each includes a standard connector 20 provided for interconnecting via a standard mating sleeve 40. The optical signal transmission system further includes a pair of high power optical adapters 150, each supported on a standard housing having a ferrule 170 contained in the housing inserted with a thermally expanded core (TEC) fiber 160. Each of the standard connectors 20 is mounted to each of the pair of high power optical adapters 150. And, each of the high power optical adapters 150 is mounted to the standard mating sleeve 40 to interconnect the two optical fibers. In another preferred embodiment, the thermally expanded core (TEC) fiber 160 having a mode field diameter greater than 20 micrometers. In another preferred embodiment, the standard attenuator housing further comprising a standard female-type mating-inlet 155 for mating and connecting with the standard optical connector 20. In another preferred embodiment, the ferrule 170 inserted with the TEC fiber 160 further extends from the standard attenuator housing for providing a male-type mating-extension 165. In another preferred embodiment, the thermally expanded core (TEC) fiber 160 inserted in the ferrule having an expanded end surface 175 at the male-type mating-extension 165. In another preferred embodiment, the male-type mating-extension 165 is compatibly adaptable into a standard mating sleeve 40 for optically aligning with and physically engaging another optical component, i.e., another high power adapter 150, compatible with the standard mating sleeve 40. In another preferred embodiment shown in FIG. 6, instead of the TEC fiber, a standard single mode fiber fused to a graded index lens/multi-mode fiber with the same diameter is used for reducing the power density. According to FIG. 6, this invention discloses a high power optical adapter 150'. The high power adapter 150' includes a first coupling means 155 for optically coupling to a first optical signal transmission means, e.g., a first optical connector 20. The high power adapter further includes a second coupling means, e.g., the male-type mating extension 165, for optically coupling to a second signal transmission means, e.g., another high power optical adapter 150. And, the second coupling means, e.g., the male type mating extension 165, includes a power density reduction means, e.g., graded index lens/multi-mode fiber 185 for interfacing with the second signal transmission means, e.g., another high power optical adapter 150. This configuration is to form a power-density reduction interface 180 (See FIG. 5B).

In summary, this invention discloses a high power optical adapter that includes a first coupling means 155 for optically coupling to a first optical signal transmission means, e.g., a first optical connector 20. The high power adapter further includes a second coupling means, e.g., the male-type mating extension 165, for optically coupling to a second signal transmission means, e.g., another high power optical adapter 150. And, the second coupling means, e.g., the male type mating extension 165, interfacing with the second signal transmission means, e.g., another high power optical adapter 150, to form a power-density reduction interface 180. In a preferred embodiment, the power-density reduction interface is an interface 180 at an expanded end surface of a thermally expanded core (TEC) optical fiber 160. In another preferred embodiment, the first coupling means is a female-type mating-inlet 155 for optically coupling to a standard optical connector 20. In another preferred embodiment, the second coupling means is a male-type mating-extension 165 for mechanically inserted to a standard mating sleeve 40 for optical coupling to a second high power optical adapter 150. In another preferred embodiment, the first and second coupling means are a male-type mating-inlet for optically coupling to a standard optical connector 20. In another preferred embodiment, the female-type mating-inlet 155 for optically coupling to a standard optical connector 20 is a standard female-type mating-inlet supported on a standard attenuator housing. In another preferred embodiment, the male-type mating-extension 165 for mechanically inserted to a standard mating sleeve 40 is a standard male-type mating-extension 165 supported on a standard attenuator housing.

Figure 1A:
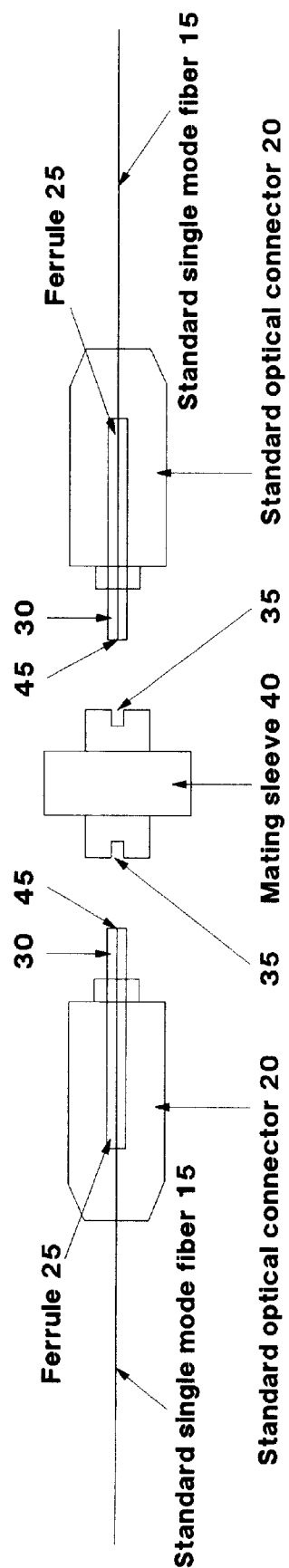
FIGS. 1A and 1B are cross sectional views of two standard optical connectors, each connected at a terminal end of a optical fiber segment, and a mating sleeve for interconnecting two segments of optical fibers by mating with two standard connectors from both ends.
Figure 1B:
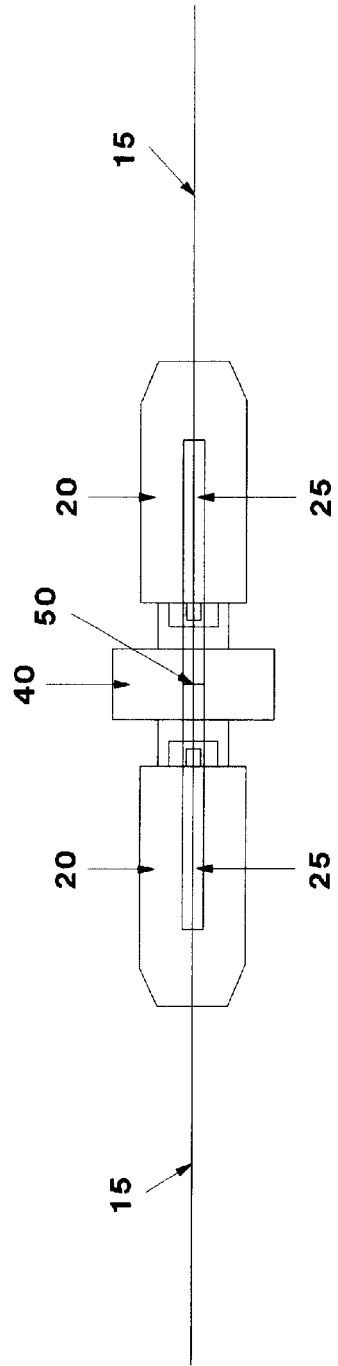
Figure 2A:
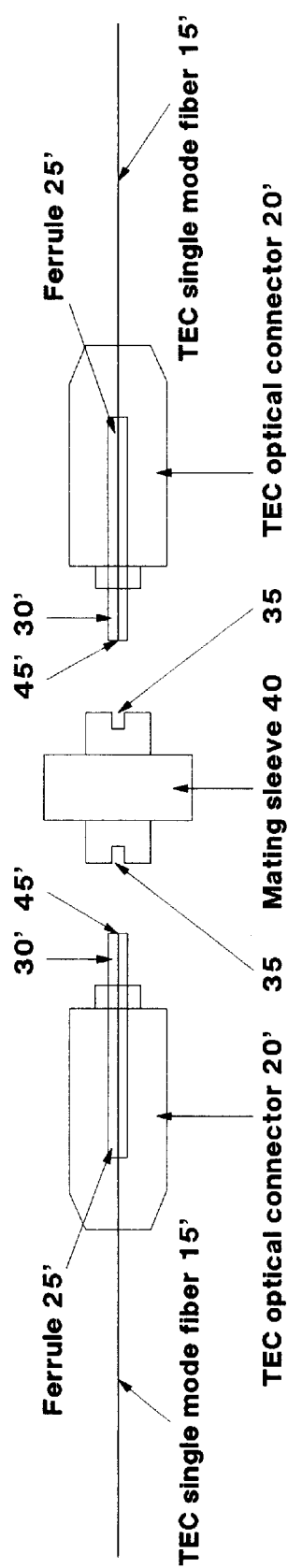
FIGS. 2A and 2B are cross sectional views of two TEC optical connectors, each connected at a terminal end of a optical fiber segment, and a mating sleeve for interconnecting two segments of optical fibers by mating with two TEC connectors from both ends.
Figure 2B:
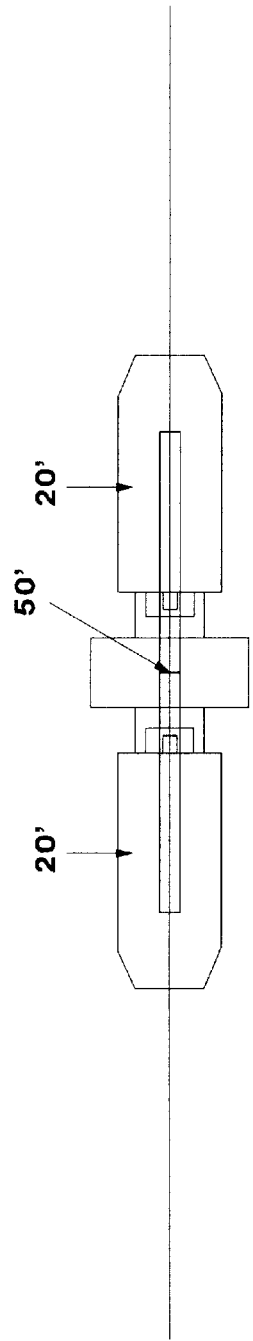

This invention further discloses a method for interconnecting two optical fibers 15 each formed with a standard connector 20 suitable for interconnection via a mating sleeve 40 as that shown in FIGS. 1A and 1B. The method comprises steps of a) forming a pair of high power optical adapters 150 by replacing an attenuating fiber in each of a pair of standard attenuators with a thermally expanded core (TEC) fiber 160; b) mounting each of the standard connectors 20 to each of the pair of high power optical adapters 150 formed by using the standard attenuators. And c) mounting each of the high power optical adapters 150 to the mating sleeve 40 to interconnect the two optical fibers 15 as that shown in FIG. 5B.

Referring to FIG. 4, this invention also discloses a method for forming high power optical adapter 150 for compatibly connecting to standard fiber optical components. The method includes a step of a) replacing an attenuating fiber in a standard attenuator with a thermally expanded core (TEC) fiber 160.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

We claim:

1. A method for interconnecting two optical fibers each formed with a standard connector suitable for interconnection via a mating sleeve, the method comprising steps of a) forming a pair of high power optical adapters by inserting a thermally expanded core (TEC) fiber in each of a pair of standard plug type attenuator housing;

b) mounting each of said standard connectors to each of said pair of high power optical adapters formed by using said standard attenuator housing; and c) mounting each of said high power optical adapters to said mating sleeve to interconnect said two optical fibers.

2. A method for forming high power optical adapter for compatibly connecting to standard fiber optical components comprising:

a) replacing an attenuating fiber in a standard attenuator extended from a first end of said attenuator with a thermally expanded core (TEC) fiber; and b) opening a standard-connector mating-inlet at a second end of said standard attenuator opposite said first end ready to receive a standard optical fiber-extension therein.

3. A high power optical adapter compatibly connectable to standard fiber optical components comprising:

a standard housing supporting a ferrule;

a fiber with a power density reduced end-surface inserted from a first end of said housing into said ferrule; and a standard-connector mating-inlet opened at a second end of said standard housing opposite said first end ready to receive a standard optical fiber-extension therein.

4. The high power optical adapter of claim 3 wherein:

said power density reduction end surface extended from said first end of said standard housing is formed by a thermally expanded core (TEC) fiber having a mode field diameter greater than 20 micrometers.

5. The high power optical adapter of claim 3 wherein:

said standard housing is a standard attenuator housing having said standard-connector mating-inlet opened at said second end.

6. The high power optical adapter of claim 3 wherein:

said power density reduction end-surface is formed by an interface at an expanded end surface of a fiber collimator formed by fusing a standard single mode fiber to a graded index lens and/or a multi-mode fiber with a same diameter.

7. The high power optical adapter of claim 5 wherein:

said standard-connector mating-inlet comprising a standard female-type mating inlet for mating and connecting with a standard optical connector by receiving said standard optical fiber-extension extended therefrom.

8. The high power optical adapter of claim 4 wherein:

said ferrule inserted with said TEC fiber further extends from said first end of said standard attenuator housing for providing a male-type mating-extension.

9. The high power optical adapter of claim 4 wherein:

said ferrule inserted with said TEC fiber further extends from said first end of said standard attenuator housing for providing a male-type mating-extension; and said thermally expanded core (TEC) fiber inserted in said ferrule having an expanded end surface at an end of said male-type mating-extension.

10. The high power optical adapter of claim 6 wherein:

said male-type mating-extension is compatibly adaptable into a standard mating sleeve for optically aligning with and physically engaging another optical component adapted in and mated through said standard mating sleeve.

11. An optical signal transmission system comprising:

two optical fibers, each includes a standard connector provided for interconnecting via a standard mating sleeve;

a pair of high power optical adapters, each supported on a standard housing having a ferrule contained in said housing inserted with a single mode fiber with a power density reduced end face;

each of said standard connectors is connected to each of said pair of high power optical adapters; and each of said high power optical adapters is mounted to a mating sleeve to interconnect said two optical fibers.

12. The optical signal transmission system of claim 11 wherein:

said power density reduced end face is a thermally expanded core (TEC) fiber having a mode field diameter greater than 20 micrometers.

13. The optical signal transmission system of claim 11 wherein:

said standard housing further comprising a standard female-type mating-inlet for mating and connecting with said standard optical connector.

14. The optical signal transmission system of claim 11 wherein:

said ferrule inserted with said TEC fiber further extends from said standard housing for providing a male-type mating-extension.

15. The optical signal transmission system of claim 11 wherein:

said ferrule inserted with said TEC fiber further extends from said standard housing for providing a male-type mating-extension.

said thermally expanded core (TEC) fiber inserted in said ferrule having an expanded end surface at said male-type mating-extension.

16. The optical signal transmission system of claim 14 wherein:

said male-type mating-extension is compatibly adaptable into a standard mating sleeve for optically aligning with and physically engaging another optical component compatible with said standard mating sleeve.

17. A high power optical adapter comprising:

a first coupling means disposed on a first end of said adaptor for compatibly-ready adapting and optically coupling to a first optical signal transmission means and a second coupling means disposed on a second end of said adaptor for optically adapting and coupling to a second signal transmission means wherein said second coupling means interfacing with said second signal transmission means to form a power-density reduction interface.

18. The high power optical adapter of claim 17 wherein:

said second coupling means comprising a thermally expanded core (TEC) optical fiber extended from said second end of said adapter and said power-density reduction interface is an interface at an expanded end surface of said thermally expanded core (TEC) optical fiber.

19. The high power optical adapter of claim 17 wherein:

said second coupling means comprising a fiber collimator formed by fusing standard single mode fiber to a graded index lens and/or a multi-mode fiber with a same diameter and extended from said second end of said adapter and;

said power-density reduction interface is an interface at an expanded end surface of said fiber collimator.

20. The high power optical adapter of claim 17 wherein:

said first coupling means disposed on said first end of said adaptor comprising a female-type mating-inlet for optically coupling to a standard optical connector.

21. The high power optical adapter of claim 17 wherein:

said first coupling means disposed on said first end of said adaptor comprising a male-type mating-inlet for optically coupling to a standard optical connector.

22. The high power optical adapter of claim 17 wherein:

said second coupling means disposed on said second end of said adaptor comprising a male-type mating-extension for mechanically inserted to a standard mating sleeve for optical coupling to a second high power optical adapter.

23. The high power optical adapter of claim 20 wherein:

said female-type mating-inlet for adapting and optically coupling to a standard optical connector is a standard female-type mating-inlet supported on a standard attenuator housing.

24. The high power optical adapter of claim 21 wherein:

said male-type mating-extension for mechanically inserted to a standard mating sleeve is a standard male-type mating-extension supported on a standard attenuator housing.

* * * * *